United States Patent [19]

Yamaoka et al.

[11] Patent Number: 4,819,508
[45] Date of Patent: Apr. 11, 1989

[54] TRANSMISSION SYSTEM FOR WORKING VEHICLES

[75] Inventors: Kojiro Yamaoka, Nishinomiya; Shusuke Nemoto, Yao, both of Japan

[73] Assignee: Kanzaki Kokyukoki Mfg. Co., Ltd., Amagasaki, Japan

[21] Appl. No.: 122,276

[22] Filed: Nov. 18, 1987

[30] Foreign Application Priority Data

Dec. 5, 1986 [JP] Japan ............... 61-289999

[51] Int. Cl.$^4$ ............... F16H 37/06; F16H 47/00; F16H 1/14; B60K 17/356
[52] U.S. Cl. ............... 74/665 GC; 74/417; 74/720; 74/664; 74/665 T; 180/242
[58] Field of Search ............... 74/417, 664, 665 S, 74/665 T, 665 GE, 665 GC, 665 GB, 720; 180/242, 75.1

[56] References Cited

U.S. PATENT DOCUMENTS

| | | | |
|---|---|---|---|
| 2,145,183 | 1/1939 | Ledwinka | 74/665 T |
| 2,521,658 | 9/1950 | Van Voorhis | 74/665 T |
| 2,872,831 | 2/1959 | Wood | 74/665 GE |
| 2,981,373 | 4/1961 | Van Ranst | 74/417 |
| 3,765,258 | 10/1973 | Jespersen | 74/243 R |
| 3,828,560 | 8/1974 | Larjukhin et al. | 74/665 T |
| 3,942,390 | 3/1976 | Dunn | 74/529 |
| 4,049,072 | 9/1977 | Savage | 180/242 |
| 4,116,294 | 9/1978 | Johnston | 180/242 |
| 4,148,262 | 4/1979 | Eichinger | 74/417 |
| 4,304,141 | 12/1981 | Tone et al. | 74/15.66 |
| 4,404,868 | 9/1983 | Kleine | 74/665 GE |

FOREIGN PATENT DOCUMENTS

| | | | |
|---|---|---|---|
| 2005577 | 8/1970 | Fed. Rep. of Germany | 74/665 T |
| 2408712 | 9/1974 | Fed. Rep. of Germany | 74/417 |
| 1293956 | 4/1962 | France | 180/242 |
| 1354571 | 1/1964 | France | 74/665 GE |
| 0140379 | 2/1980 | German Democratic Rep. | 74/417 |
| 1171631 | 11/1969 | United Kingdom | 74/417 |

Primary Examiner—Dirk Wright
Assistant Examiner—Harold F. Macris

[57] ABSTRACT

Separate left and right hydrostatic transmissions (17) for controlling rotation of left and right final drive wheels (11) of a working vehicle independently are disposed laterally inwardly of the drive wheels in a vertical posture such that, while an input shaft (18) is directed axially outwardly of the vehicle, an output shaft (19) is directed axially inwardly of the vehicle. To each of the hydrostatic transmissions is attached a L-shaped gear box (20) which extends over axially inward and laterally outer sides of the hydrostatic transmission and supports the axle (21) of final drive wheel. Within the box is housed first and second reduction gear trains which form L-shaped transmission path between the output shaft and axle.

The hydrostatic transmission (17) and gear box (20) of each side may be handled as a unit in assembling the transmission system and are compactly disposed in the proximity of each final drive wheel (11).

Engine (13) is mounted at the middle of left and right hydrostatic transmissions (17) in a horizontal posture such that engine output shaft (14) is directed axially outwardly of the vehicle. The entire transmission system is thus disposed at a predetermined location in the axial or longitudinal direction of vehicle. A power take-off mechanism (25, 26) powered by the engine may preferably provided at an axial end of vehicle.

4 Claims, 5 Drawing Sheets

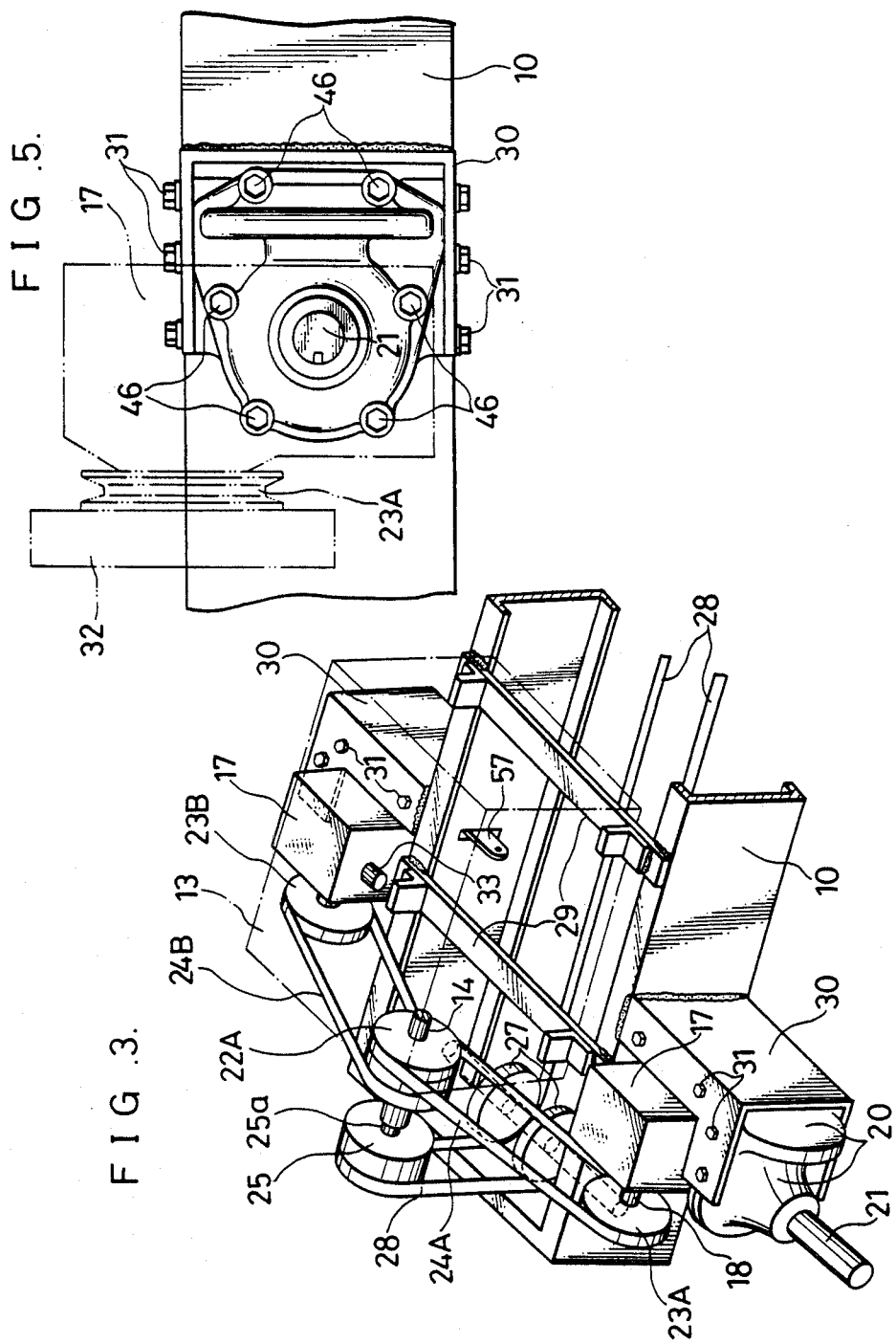

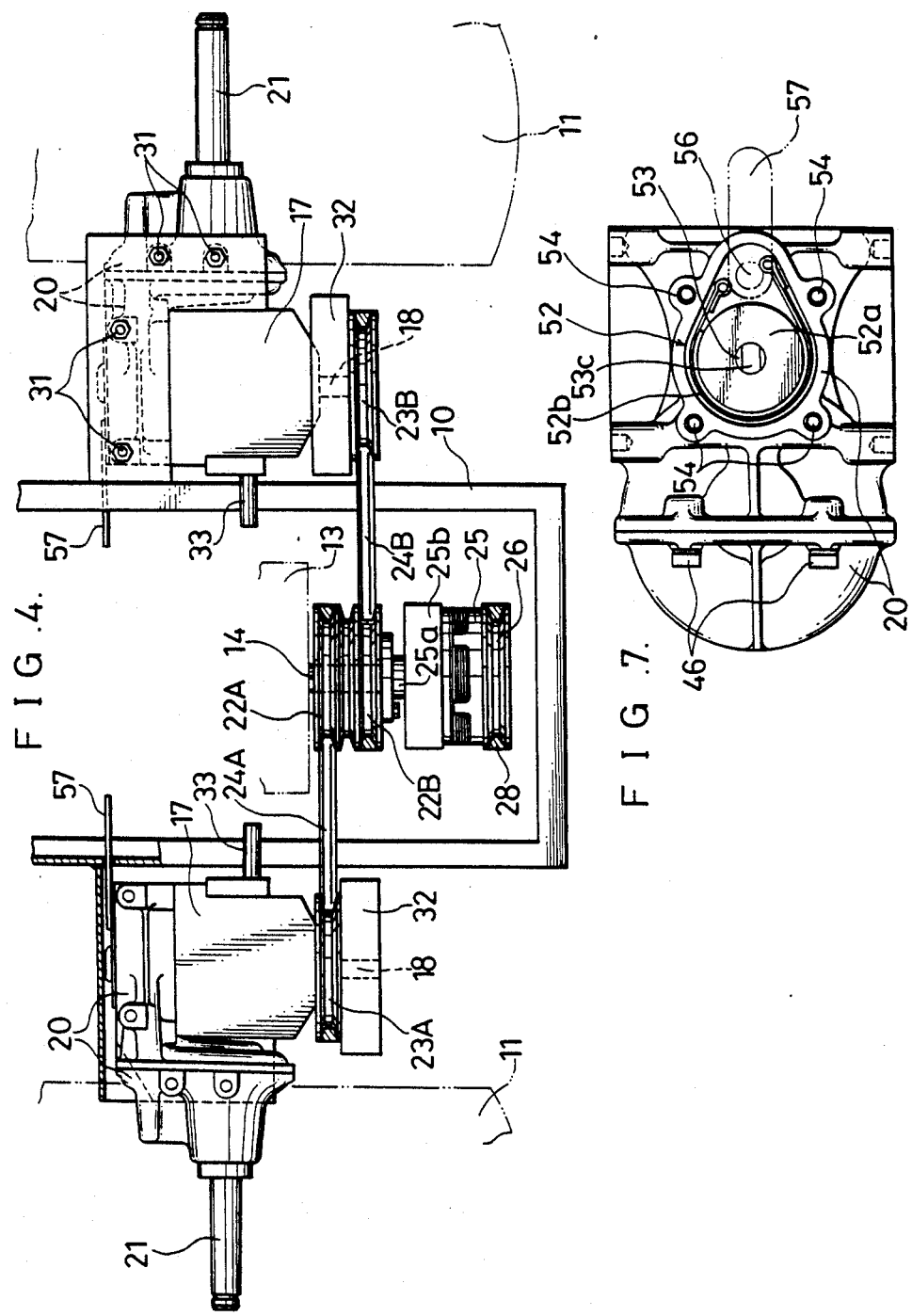

TRANSMISSION SYSTEM FOR WORKING VEHICLES

FIELD OF THE INVENTION

This invention relates to a transmission system for a relatively small-sized working vehicle such as mower tractor, and more particularly to a transmission system comprising hydrostatic transmissions by which the vehicle speed is continuously variable with a selective reverse of travelling direction.

BACKGROUND OF THE INVENTION

As is disclosed in U.S. Pat. Nos. 3,765,258 and 3,942,390, there is known a transmission system for working vehicles comprising a pair of separate left and right hydrostatic transmissions which transmit power of an engine towards left and right final drive wheels (travelling wheels or caterpillar track-driving wheels) independently at continuously variable transmission ratios. In such transmission system, left and right speed-reduction mechanisms are interposed between the left and right hydrostatic transmissions and the left and right final drive wheels for transmitting rotation of output shafts of the hydrostatic transmissions to the final drive wheels with a reduced speed of rotation.

A vehicle including a transmission system of this type is steered or turned using a change lever device for controlling hydrostatic transmissions or variable displacement hydraulic pumps thereof. A spin turn of vehicle may be attained by controlling the left and right hydrostatic transmissions so as to drive the left and right final drive wheels to rotate into opposite directions with an equal speed of rotation. A gentle turn of vehicle with a desired turning radius may be attained by controlling the left and right hydrostatic transmissions so as to drive the left and right final drive wheels to rotate into a same direction with different speeds of rotation. It is thus seen that a transmission system comprising a pair of separate left and right hydrostatic transmissions provides an excellent maneuverability to a vehicle. Left and right speed-reduction mechanisms referred to before transmit the rotation of output shafts of left and right hydrostatic transmissions to axles of left and right final drive wheels with a reduced speed of rotation so as to enlarge the torque for driving the left and right travelling wheels or track-driving wheels. Such speed-reduction mechanisms will also eliminate, when a vehicle is travelled with a low speed, a necessity of controlling the vehicle speed by bringing hydrostatic transmissions into a low speed range where output rotation speed of the hydrostatic transmissions becomes unstable.

Two typical examples of the structure according to the prior art are shown in the two U.S. patents referred to before.

In the transmission system shown in U.S. Pat. No. 3,765,258, an engine is mounted on a front portion of vehicle in a posture slightly inclined towards a forward and downward direction. Forwardly of this engine and in the middle of the vehicle is arranged a gear box. Left and right hydrostatic transmissions are mounted on the left and right side walls of such gear box into which input shafts as well as output shafts of the left and right hydrostatic transmissions extend. Power of the engine is transmitted into the gear box and then to the input shafts via a bevel gearing. Axles of left and right track-driving wheels are arranged so that they extend from a low level within the gear box largely towards the left and right, respectively. Left and right speed-reduction mechanisms are disposed within the gear box and are composed of left and right gear trains each having a smaller spur gear on each of the output shafts and a larger spur gear on each of the axles.

In the transmission system shown in U.S. Pat. No. 3,942,930, while an engine is mounted on a front portion of vehicle, separate left and right hydrostatic transmissions are arranged on a rear portion of the vehicle in a horizontal posture such that input shafts thereof extend forwardly whereas output shafts extend rearwardly. A horizontal transmission shaft, drivenly connected to the engine output shaft, is provided which passes between the left and right hydrostatic transmissions and extends to a rear end portion of the vehicle so as to be utilized as a power takeoff shaft for a working implement. Input shafts of the left and right hydrostatic transmissions are drivenly connected to such transmission shaft via left and right transmission devices having belts, respectively. Left and right final drive units which comprise as output shafts thereof axles of left and right track-driving wheels are disposed on the underside of vehicle and behind the left and right hydrostatic transmissions. Such left and right drive units comprise forwardly extending left and right input shafts between which a horizontal cluster-sprocket support shaft is disposed. Left and right speed-reduction mechanisms are provided each of which comprises first and second speed-reducing trains having first and second chains. The first chain is entrained over a first sprocket, fixedly mounted on the output shaft of each hydrostatic transmission, and a second sprocket rotatably mounted on the sprocket support shaft. The second chain is entrained over a third sprocket, rotatably mounted on the support shaft and rotatable in unison with the second sprocket, and a fourth sprocket fixedly mounted on the input shaft of each drive unit.

As described above, the transmission system disclosed in U.S. Pat. No. 3,942,390 is fashioned such that the hydrostatic transmission and final drive unit of each of the left and right sides are provided separately from each other and are placed at different locations. Between such hydrostatic transmission and final drive unit are disposed two trains of chains. It is thus seen that the transmission system occupies a considerable space as a whole and the assemblage thereof is troublesome. Contrarily to this, the transmission system disclosed in U.S. Pat. No. 3,765,258 occupies a relatively small space and can be assembled with ease. This is because the left and right hydrostatic transmissions employed in this system are mounted on the outer surfaces of a gear box including a bevel gearing, by which a transmission path from engine is bent and is connected to the input shafts of left and right hydrostatic transmissions, and left and right reduction gear trains which are disposed between the output shafts of left and right hydrostatic transmissions and the axles of left and right track-driving wheels.

The transmission system disclosed in U.S. Pat. No. 3,765,258 includes, however, only one reduction gear train in each of the transmission paths between the left and right hydrostatic transmissions and the left and right track-driving wheels and is thus inferior to the transmission system disclosed in U.S. Pat. No. 3,942,390 in an ability of enlarging the vehicle-driving torque and also in securing a stable vehicle speed at a low speed range. It is considered that, if a further reduction gear train were additionally provided at each side of the interior of the gear box disclosed in U.S. Pat. No. 3,765,258, then it would be required to enlarge such gear box considerably either in length or in height. Enlargement of the gear box in length will result in an enlargement of the length of vehicle. Enlargement of the gear box in height will cause an undue lowering of the level of final drive wheels and axles thereof so that a stable support of vehicle body by caterpillar tracks or travelling wheels is damaged.

In a transmission system comprising left and right wheel axles which extend laterally outwardly from a gear box having a small width and arranged in the middle of the vehicle, such as the one disclosed in U.S. Pat. No. 3,765,258, a large interval is caused between each caterpillar track or travelling wheel, which supports the vehicle on the ground, and the heavy gear box and hydrostatic transmissions so that a large stiffness is required to the vehicle body or frame. Furthermore a concentrated arrangement of transmission units in the middle of width of the vehicle may provide a restriction to the arrangement of a power take-off mechanism which is often fashioned to have a transmission path extending through such middle portion of the vehicle.

OBJECTS

Accordingly, a primary object of the present invention is to provide a novel transmission system of the type comprising separate left and right hydrostatic transmissions and speed-reduction mechanisms, wherein each of the reduction mechanisms includes two sets of speed-reduction trains in a very compact fashion adapted to be affixed to each of the hydrostatic transmissions so as to permit an easy assemblage of the transmission system, and wherein the left and right hydrostatic transmissions and speed-reduction mechanisms are disposed in the proximity of left and right final drive wheels so as to attain a stable support of the transmission units and so as not to provide a restriction to the arrangement of a power take-off mechanism.

A further object of the present invention is to provide a transmission system for working vehicles wherein the whole of transmission units is placed concentratedly at a same location in the axial direction of the vehicle so as to reduce the length of vehicle and so as to secure a large space for a mid-mount working implement, such as mid-mount mower, at the underside of vehicle.

BRIEF DESCRIPTION OF THE DRAWINGS

Other objects and advantages of the invention will become readily apparent as the specification is considered in conjunction with the accompanying drawings, in which:

FIG. 3 is a schematic perspective view showing essential parts provided at a rear end portion of the working vehicle shown in FIG. 1;

FIG. 4 is a plane view, partially in section, of a lower half of a rear end portion of the working vehicle shown in FIG. 1;

FIG. 5 is an enlarged side view of a part of FIG. 1;

FIG. 7 is a bottom view of a gear box shown in FIG. 6 with a cover plate for brake mechanism removed;

FIG. 8 is an enlarged perspective view of a brake shaft shown in FIG. 6; and

FIG. 9 is an enlarged perspective view of a sleeve member shown in FIG. 6.

SUMMARY OF THE INVENTION

Figure 1:
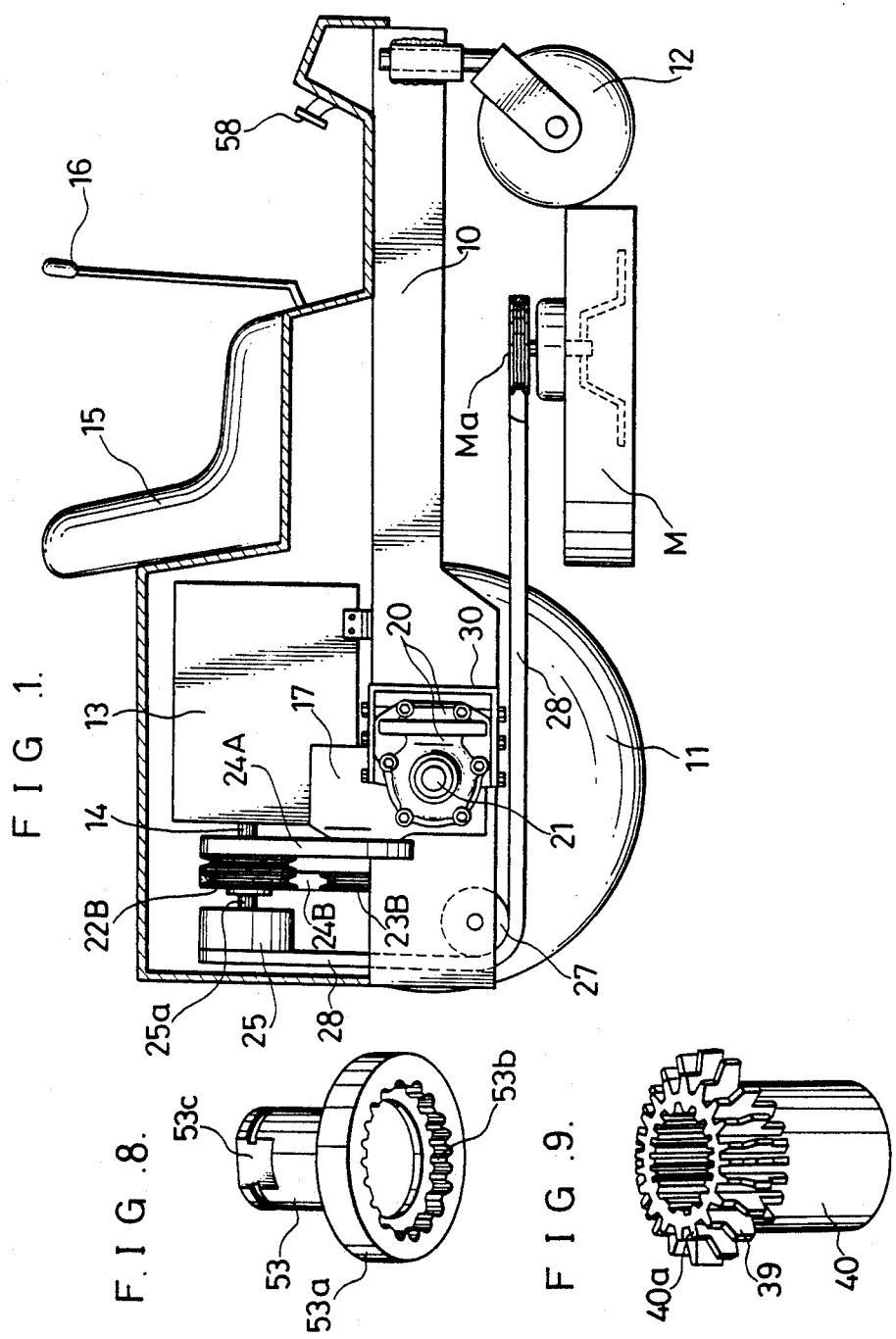
FIG. 1 is a schematic side view, partially in section, of a working vehicle in which an embodiment of the transmission system according to the present invention is employed.
Figure 2:
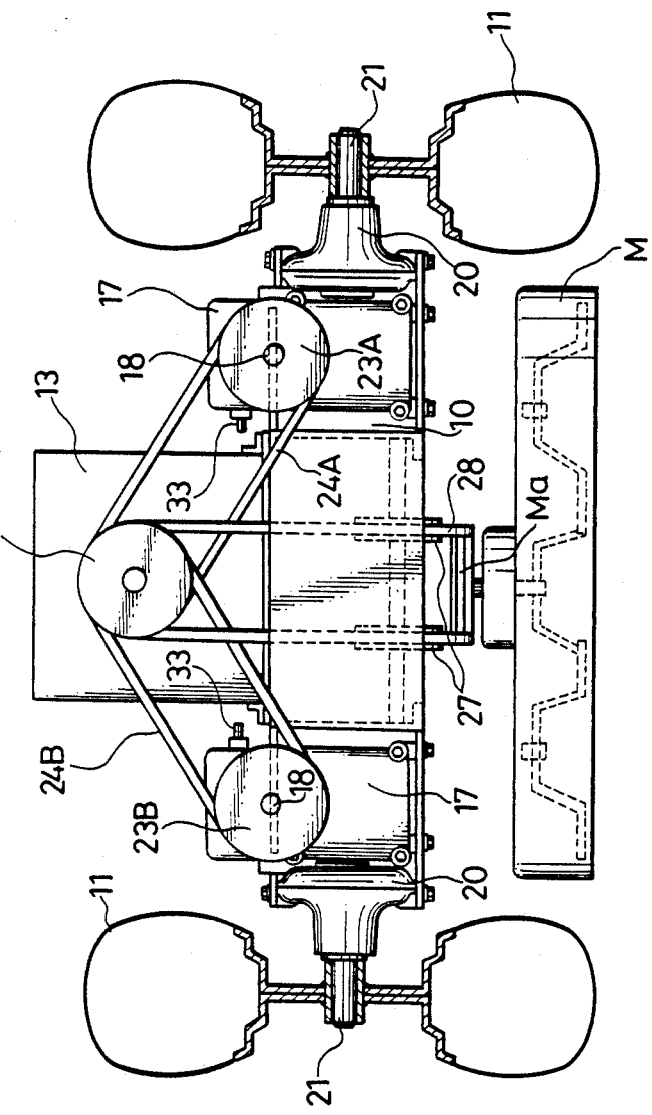
FIG. 2 is a schematic rear view, partially in section and partially omitted, of the working vehicle shown in FIG. 1.

The present invention relates to a transmission system for working vehicles which comprises, as shown in FIGS. 1 and 2, a pair of separate left and right hydrostatic transmissions 17 for transmitting power of an engine 13 towards left and right final drive wheels 11 with a continuously variable speed, respectively; and left and right speed-reduction mechanisms 35 (FIG. 6) interposed between the left and right hydrostatic transmissions 17 and the left and right final drive wheels 11.

As shown in FIGS. 2 and 4, the left and right hydrostatic transmissions 17 are disposed, respectively, laterally inwardly of the left and right final drive wheels 11 in a vertical posture such that an input shaft 18 of each of the hydrostatic transmissions 17 is directed axially outwardly of vehicle whereas an output shaft 19 (FIG. 6) thereof is directed axially inwardly of the vehicle. In the transmission system shown, the final drive wheels are left and right rear wheels 11 so that the input shaft 18 is directed rearwardly of the vehicle whereas the output shaft 19 is directed forwardly of the vehicle.

Substantially L-shaped left and right gear boxes 20 are attached to the left and right hydrostatic transmissions 17, respectively, in a fashion such that each of the gear boxes extends axially inwardly and laterally outwardly of each of the hydrostatic transmissions 17. In the transmission system shown in which the vehicle is travelled by driving rear wheels, each gear box 20 extends over fore and outer sides of each hydrostatic transmission 17. As can be best seen from FIG. 6, the output shaft 19 of each hydrostatic transmission 17 projects into each gear box 20 by which axle 21 of the rear wheel 11 of each side is journalled at a level substantially equal to that of the output shaft 19. The gear box 20 further journals therein an intermediate shaft 38 which extends parallel with the output shaft 19 at a level substantially equal to that of the output shaft 19 and is faced at one or rear end thereof to the outer circumference of an inner end portion of the axle 21. Each of the left and right speed-reduction mechanisms 35 is disposed within each of the gear boxes 20 and includes a first reduction gear train, which comprises a smaller spur gear 39 fixedly mounted on the output shaft 19 and a larger spur gear 42 fixedly mounted on the intermediate shaft 38 and meshing with the smaller spur gear 39, and a second reduction gear train which comprises a smaller bevel gear 43 fixedly mounted on the intermediate shaft 38 and a larger bevel gear 44 fixedly mounted on the axle 21 and meshing with the smaller bevel gear 43.

The engine 13 is mounted on the vehicle at the middle of the left and right hydrostatic transmissions 17 in a horizontal posture such that an engine output shaft 14 is directed axially outwardly or rearwardly of the vehicle. The engine output shaft 14 is drivingly connected to the input shafts 18 of the left and right hydrostatic transmissions 17 via endless and flexible transmitting means or belts 24A and 24B which are entrained over wheels or pulleys 22A, 22B, which are fixedly mounted on the engine output shaft 14, and wheels or pulleys 23A, 23B which are fixedly mounted on the input shafts 18.

In the transmission system according to the present invention, power of the engine 13 is transmitted to the input shafts 18 of the left and right hydrostatic transmissions 17 via endless and flexible transmitting means 24A and 24B. Power is then transmitted from the output shafts 19 of the left and right hydrostatic transmissions 17 to the left and right axles 21 via the left and right speed-reduction mechanisms 35 each of which comprises a L-shaped bent transmission path and performs a two-stage reduction of rotation speed so as to largely highten the torque for driving the final drive wheel 11.

In a working vehicle in which left and right final drive wheels are provided at a front end portion of the vehicle, the whole of the transmission system shown including engine 13 is disposed at the front of vehicle with the arrangement reversed in the forward and backward direction of the vehicle. The vehicle is thus fashioned to have a front-mounted engine.

The first reduction gear train of each speed-reduction mechanism 35 comprising meshing spur gears 39 and 42 performs a first stage speed-reduction at a location just before each hydrostatic transmission 17 in a vehicle having a rear-mounted engine or at a location just behind each hydrostatic transmission in a vehicle having a front-mounted engine, whereas the second reduction gear train comprising meshing bevel gears 43 and 44 performs a second stage speed-reduction at a location just outside the hydrostatic transmission 17. The speed-reduction mechanism 35 including such first and second reduction gear trains is disposed compactly over fore (or aft) and outer sides of a hydrostatic transmission and may be housed within a L-shaped gear box 20 attached to the hydrostatic transmission. The hydrostatic transmission 17 and gear box 20 of each side may be preassembled and handled as a unit for an easy assemblage of the transmission system.

The speed-reduction mechanism 35 occupies only a narrow space at the outer side of hydrostatic transmission 17, because the mechanism 35 comprises at such outer side only the second reduction gear train having meshing bevel gears 43 and 44. It is thus seen that the left and right hydrostatic transmissions 17 may be disposed in the proximity of left and right final drive wheels 11 for attaining a stable support of the hydrostatic transmissions 17 and speed-reduction mechanisms 35 associated therewith.

Axle 21 of the final drive wheel disposed at a level substantially the same as that of the output shaft 19 which projects from the upstanding hydrostatic transmission 17 axially inwardly of the vehicle does not result in an undue lowering of the level of the final drive wheel 11.

Horizontal mounting of the engine 13 at the middle of left and right hydrostatic transmissions 17 with the engine output shaft 14 directed axially outwardly of the vehicle permits an easy driving connection between the engine output shaft 14 and the input shafts 18 of hydrostatic transmissions as well as an easy provision of a power take-off mechanism powered by engine within an axial end space of the vehicle. In the transmission system shown, a power take-off pulley 26 which is disposed coaxially with the engine output shaft 14 and is driven to rotate by this shaft through a clutch 25 is provided axially outwardly of the drive wheels 22A, 22B on the shaft 14 and within a rear end space of the vehicle.

Mounting of the engine 13 on the vehicle at the middle of left and right hydrostatic transmissions 17 also achieves a concentrated arrangement of the whole of transmission units at a same location of the length of vehicle where left and right final drive wheels 11 are disposed. Such concentrated arrangement of the whole of the transmission units at a predetermined location in the axial or longitudinal direction of vehicle contributes to reduce the length of vehicle as well as to secure a large space for a mid-mount working implement, such as a mid-mount mower M shown, at the underside of vehicle.

DESCRIPTION OF A PREFERRED EMBODIMENT

Vehicle Structure

FIG. 1 schematically shows a working vehicle in which a preferred embodiment of the present invention is employed.

The working vehicle shown is a mower tractor having a vehicle frame 10 of joined plate members. The vehicle is fashioned so as to be travelled by the rotation of left and right rear wheels 11. The vehicle is steered by driving the left and right rear wheels 11 to rotate with different speeds of rotation or to rotate in opposite directions, as will be detailed later. Left and right front wheels 12 are composed of casters each of which is supported pivotally about a vertical axis at the front end of the frame 10. Before the rear wheels 11 and at the underside of vehicle frame 10 is mounted a mid-mount mower M.

As shown in FIGS. 1 to 3, an engine 13 is mounted on a rear end portion of the vehicle frame 10 in a horizontal posture such that an engine output shaft 14 is directed rearwardly. Before the engine 13 is arranged a seat 15. A pair of left and right change levers 16 are provided which have their operating ends before the seat.

Arrangement of Transmission Units

As shown in FIGS. 1 to 4, the transmission system shown comprises left and right hydrostatic transmissions 17 which are disposed, respectively, laterally inwardly of the left and right rear wheels 11 in a vertical posture. Input shaft 18 of each hydrostatic transmission 17 extends rearwardly at a level lower than that of the engine output shaft 14, whereas output shaft 19 shown in FIG. 6 extends forwardly at a level lower than that of the input shaft 18. To the left and right hydrostatic transmissions 17 are affixed left and right gear boxes 20 each of which is substantially L-shaped and extends over fore and outer sides of each hydrostatic transmission 17. Axles 21 of the left and right rear wheels 11 are rotatably supported by the left and right gear boxes 20.

On the engine output shaft 14 are fixedly mounted two pulleys 22A and 22B which are formed integrally with each other. Corresponding pulleys 23A and 23B are fixedly mounted on the input shafts 18 of the left and right hydrostatic transmissions 17. Power of the engine 13 is transmitted to the left and right hydrostatic transmissions 17 via a belt 24A entrained over the pulleys 22A and 23A and via a belt 24B entrained over the pulleys 22B and 23B, respectively. The belt drive shown may be substituted by a chain drive.

As shown in FIGS. 3 and 4, an electromagnetic clutch 25 and a PTO-pulley 26 are arranged coaxially with the engine output shaft 14 at the rear end of vehicle. Input shaft 25a of the clutch 25 is fixedly coupled to the engine output shaft 14, whereas the pulley 26 is fixed to a driven member of the clutch 25. As shown in FIGS.

1 to 3, the PTO-pulley 26 is employed for driving the mower M through a belt 28 which is entrained over such pulley 26, a pair of guide pulleys 27 located below the PTO-pulley, and an input pulley Ma of the mower.

Mounting plate members 29 shown in FIG. 3 are employed for mounting the engine 13 on the vehicle frame 10. Each gear box 20 is fixedly secured to each hydrostatic transmission 17 using fastener bolts (not shown) which are threadingly engaged to the front wall of hydrostatic transmission 17 through the box 20. To side walls of the vehicle frame 10 are welded a pair of C-shaped support frames 30 by which left and right hydrostatic transmissions 17 and gear boxes 20 are fixedly supported using fastener bolts 31 for fastening the gear boxes 20 to the frames 30. Left and right bearing boxes 32 shown in FIG. 4 are fixedly provided for supporting the input shafts 18 of left and right hydrostatic transmissions 17. Electromagnetic clutch 25 is supported at its casing portion 25b shown in FIG. 4 by the vehicle frame 10 through a bracket (not shown).

As shown in FIGS. 2 and 4, control shafts 33 for controlling swash plates of the hydraulic pumps (not shown) of the left and right hydrostatic transmissions 17 are projected laterally inwardly and are operatively connected to the left and right change levers 16 shown in FIG. 1.

Speed-Reduction Mechanisms

Figure 6:
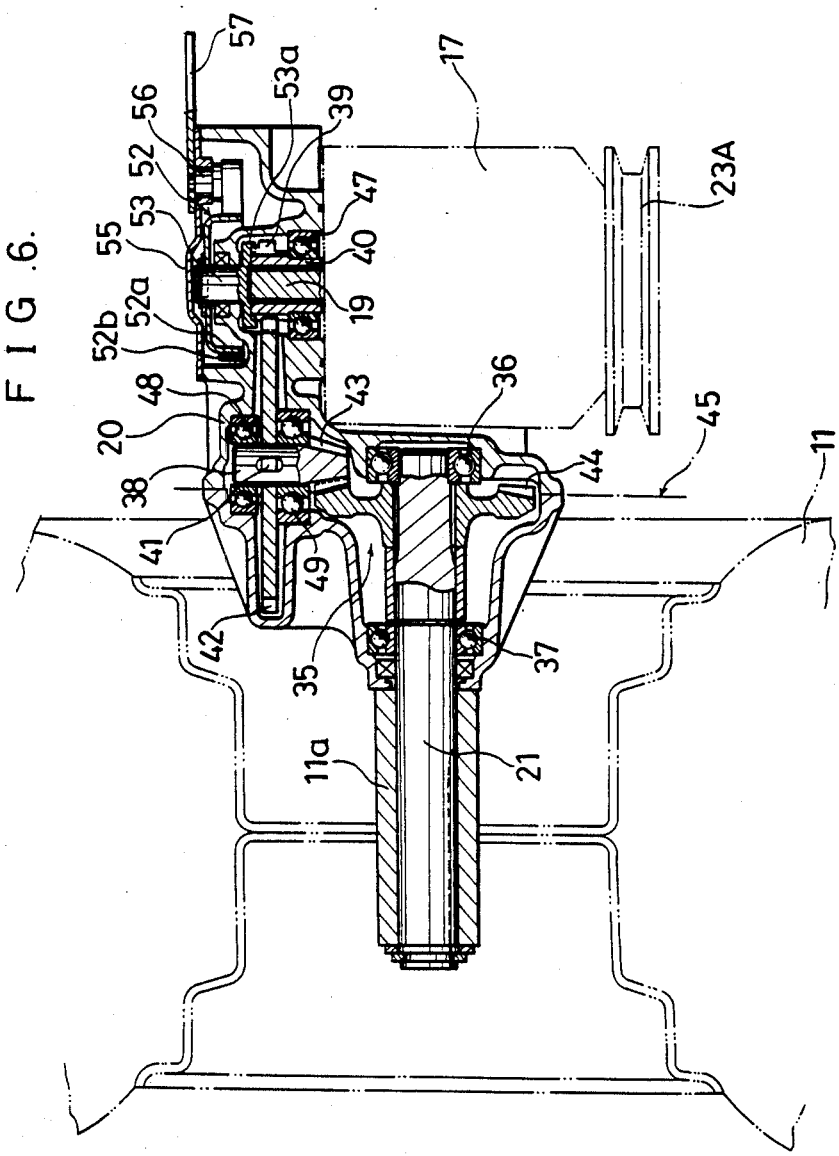
FIG. 6 is an enlarged cross-sectional plane view of a part of FIG. 4.

Left and right speed-reduction mechanisms to be interposed between the left and right hydrostatic transmissions 17 and the left and right rear wheels 11 are disposed within left and right gear boxes 20, as shown in FIG. 6 with respect to a speed-reduction mechanism 35 of one side. Both of the speed-reduction mechanisms 35 affixed to the left and right hydrostatic transmissions 17 have the same structure and the following descriptions of one of these mechanisms will suffice for both.

As shown in FIG. 6, the axle 21 is disposed so that the inner end thereof is in a close proximity with the hydrostatic transmission 17. Such axle 21 is rotatably supported by the gear box 20 through a pair of ball bearings 36 and 37 at a level substantially the same as that of the output shaft 19 of hydrostatic transmission. The gear box 20 journals therein an intermediate shaft 38 of a small length which extends parallel with the output shaft 19 at a level substantially the same as that of the output shaft and is faced at its rear end to the outer circumference of an inner end portion of the axle 21. A sleeve member 40 having thereon an integral smaller spur gear 39 is fixedly mounted on the output shaft 19 by a splined connection, whereas a larger spur gear 42 is fixedly mounted on the intermediate shaft 38 using a key 41. These smaller and larger spur gears 39 and 42 are meshed with each other so as to provide a first reduction gear train. The intermediate shaft 38 is formed integrally at its aft end portion with a smaller bevel gear 43, whereas a larger bevel gear 44 is fixedly mounted on an inner end portion of the wheel axle 21 by a splined connection. These smaller and larger bevel gears 43 and 44 are meshed with each other so as to provide a second reduction gear train. The speed-reduction mechanism 35 transmits a rotation of the output shaft 19 to the rear wheel axle 21 through the first and second reduction gear trains so that the axle 21 is driven to rotate with a largely reduced speed of rotation.

The speed-reduction mechanism 35 comprising the first and second reduction gear trains set forth above forms a bent transmission path of L-letter shape. Correspondingly, the gear box 20 is L-shaped. As a dividing plane of the gear box 20 for permitting a formation of such box by casting, a vertical plane 45 is selected which extends across the larger bevel gear 44 so as to divide the box 20 into two parts. Selection of such a dividing plane 45 permits the fastening of the outer half of the box, to which the axle 21 and larger bevel gear 44 are previously assembled, to an inner half of the box 20 from the outer side. The inner and outer halves of gear box 20 are fastened together by bolts 46 shown in FIGS. 5 and 7 which are threadingly inserted from the outer side of the box 20.

The output shaft 19 is rotatably supported by the gear box 20 through a ball bearing 47, whereas the intermediate shaft 38 is rotatably supported by the box 20 through a pair of ball bearings 48 and 49 which are disposed at fore and aft sides of the spur gear 42. The rear wheel axle 21 has thereon a wheel boss 11a of the rear wheel 11 which is keyed to an outer half of the axle 21.

Of the shafts journalled in the gear box 20, the output shaft 19 has the smallest torque. A brake 52 for braking such output shaft 19 is appended to the speed-reduction mechanism 35, as shown in FIG. 6.

This brake 52 includes a brake shaft 53 having at its aft ring portion 53a internal gear teeth 53b (FIG. 8) which are meshed with gear teeth 40a (FIG. 9) formed to the sleeve member 40 at a fore end portion thereof before the spur gear 39. This brake shaft 53 which is coaxial with the output shaft 19 has a fore end portion 53c including thereon a pair of cut-outs (FIGS. 7 and 8) on which a brake drum 52a is fixedly mounted. As shown in FIGS. 6 and 7, a brake band 52b is provided which is pressingly engaged, when tightened, with the outer circumference of brake drum 52a so as to brake the drum and brake shaft 53. A horizontal control shaft 56 for tightening the brake band 52b is rotatably supported by a cover plate 55 which is secured to the front of the gear box 20 so as to cover the brake mechanism, by means of bolts (not shown) threadingly inserted into threaded bores 54 shown in FIG. 7. To a fore or outer end of the control shaft 56 is secured a brake arm 57. Such brake arms 57 for the left and right brakes 52 extend laterally inwardly through apertures in the vehicle frame 10, as shown in FIGS. 3 and 4, and are operatively connected to left and right brake pedals 58 one of which is shown in FIG. 1.

The brake 52 shown is provided in a compact structure without being subjected to a restriction from a standard length which the output shaft of a hydrostatic transmission on the market generally has. That is, if a spur gear corresponding to the spur gear 39 shown were mounted directly on the output shaft of a standard hydrostatic transmission, then a brake member co-rotatable with the output shaft such as a brake drum or brake disk could be provided to the output shaft no more due to a restriction from the length of such output shaft. Contrarily, the spur gear 39 shown is formed to a sleeve member 40 shown in FIG. 9 which is adapted to be mounted on the output shaft 19 using a splined connection. Such sleeve member 40 is also formed with gear teeth 40a which may be machined together with the spur gear 39. By utilizing the sleeve member 40 or the gear teeth 40a thereon as coupling means, a brake shaft 53 of a small length shown in FIG. 8 which includes a diameter enlarged aft ring 53a having therein internal gear teeth 53b as coupling means is provided coaxially and co-rotatably with the output shaft 19 for providing a brake drum 52a before the output shaft 19.

The brake 52, which may have a relatively small capacity because it brakes the output shaft having the smallest torque, is thus arranged in a compact design within a space before the output shaft which space is afforded by a laterally extending transmission path formed by the meshing spur gears 39 and 42.

OPERATION

During a travel of the mower tractor shown in FIG. 1, change of the vehicle speed and selective reversing of the vehicle are performed by operating the change levers 16 shown in FIG. 1 so as to vary the angle of swash plates of the variable displacement hydraulic pumps (not shown) in the hydrostatic transmissions 17 via the control shafts 33 shown in FIGS. 3 and 4. Steering of the vehicle is performed also by operating the change levers 16. When the output shafts 19 of the left and right hydrostatic transmissions 17 are rotated into opposite directions with an equal speed of rotation, a spin turn of the vehicle is attained. By controlling the left and right hydrostatic transmissions 17 so as to drive the left and right rear wheels 11 to rotate into a same direction with different speeds of rotation, the vehicle may be turned with a turning radius which corresponds to the difference in rotation speeds between the left and right rear wheels 11.

The pair of change levers 16 employed in the tractor shown may be substituted by a single change lever which is operated for controlling the left and right transmissions for speed-change and steering purposes. An example of such single change lever is disclosed in U.S. Pat. No. 3,765,258 referred to before.

Left and right brakes 52 are operated selectively by treading-down the pedals 58 shown in FIG. 1 so as to tighten the brake band 52b against brake drum 52a shown in FIGS. 6 and 7. Rear wheels 11 are braked by the braking of output shafts 19 of the hydrostatic transmissions 17. When the vehicle is parked, the left and right pedals 58 are locked at their trodden-down positions for preventing a spontaneous start of the vehicle.

Mowing with the mower M is performed in a condition where the electromagnetic clutch 25 shown in FIG. 4 is engaged so as to transmit power from PTO-pulley 26 to the input pulley Ma of the mower. Because the vehicle may be driven at a continuously variable speed and also may be turned with a desired optional turing radius, operation which is excellent in efficiency as well as in result may be achieved.

In a front-drive vehicle, the whole of transmission system shown is displaced to the front of vehicle with the arrangement reversed in the axial direction of vehicle, as already described before, so that the vehicle is fashioned to have a front-mounted engine.

We claim:

1. A working vehicle comprising:
   a frame;
   an engine mounted on said frame, said engine including an engine output shaft which extends towards a rear of said frame;
   a first and second rear wheel disposed outside of said frame at opposite sides of the rear of said frame and rotatably mounted on first and second axles respectively; and
   a transmission assembly for transmitting the power of said engine to said first and second rear wheels with a continuously variable speed, said transmission assembly including:
   a first hydrostatic transmission disposed at one of said transverse sides of the rear of said frame proximate the first rear wheel and a second hydrostatic transmission disposed at the opposite transverse side of said frame proximate the said second rear wheel, each of said hydrostatic transmissions including a transmission input shaft which extends from said hydrostatic transmission towards the rear of the vehicle, a transmission output shaft which extends from said hydrostatic transmission away from the rear of the vehicle, and
   a control shaft extending from said hydrostatic transmission of the vehicle for controlling the transmission ratio of said hydrostatic transmission;
   a first L-shaped gear box secured to said first hydrostatic transmission and a second L-shaped gear box secured to said second hydrostatic transmission, each of said gear boxes extending over front and outer side of the hydrostatic transmission to which it is secured, the front side of each hydrostatic transmission consisting of a side thereof which is farthest from the rear of said frame and the outer side of each hydrostatic transmission consisting of a side thereof which faces away from said vehicle, said transmission output shaft of said first hydrostatic transmission extending into the first gear box, said transmission output shaft of said second hydrostatic transmission extending into said second gear box, said first axle being journaled in said first gear box, said second axle being journaled in said second gear box, each of said gear boxes including therein:
   a rotatable, intermediate shaft extending parallel with said transmission output shaft,
   a first reduction gear train having a first spur gear fixedly mounted on said transmission output shaft and a second spur gear mounted on said intermediate shaft, said second spur gear meshing with said first spur gear,
   and a second reduction gear train having a first bevelled gear fixedly mounted on said intermediate shaft and a second bevelled gear mounted on the wheel axle, said second bevelled gear meshing with said first bevelled gear; and
   transmitting means for drivingly connecting the engine output shaft with the transmission input shafts of said pair of hydrostatic transmissions and wherein said transmission output shafts lie in a first plane, said axles lie in a second plane substantially the same as said first plane, a length of said engine output shaft lies in a third plane parallel to and separate from said first plane and said transmission input shafts lie in a forth plane parallel to and between said first and third planes.

2. A working vehicle as in claim 1, further comprising a rotatable power take-off member disposed co-axially with said engine output shaft and farther toward the rear of said frame than said engine output shaft, said power take-off member being drivenly connected to the engine output shaft through a clutch.

3. A working vehicle as in claim 1, wherein each gear box further includes a brake for braking said transmission output shaft, said brake having a brake shaft which is disposed co-axially with said transmission output shaft and is engaged non-rotatably with a sleeve member mounted non-rotatably on said output shaft, one of said spur gears of said first reduction gear train being formed integrally with said sleeve member.

4. An improved working vehicle including a frame, an engine mounted on said frame, said engine including an engine output shaft which extends towards a rear of said frame, a first and second rear wheel disposed outside of said frame at opposite sides of the rear of said frame and rotatably mounted on first and second axles respectively, wherein the improvement comprises:

a transmission assembly for transmitting the power of said engine to said first and second rear wheels with a continuously variable speed, said transmission assembly including:

a first hydrostatic transmission disposed at one of said transverse sides of the rear of said frame proximate the first rear wheel and a second hydrostatic transmission disposed at the opposite transverse side of said frame proximate the said second rear wheel, each of said hydrostatic transmissions including a transmission input shaft which extends from said hydrostatic transmission towards the rear of the vehicle a transmission output shaft which extends from said hydrostatic transmission away from the rear of the vehicle said, and control shaft extending from said hydrostatic transmission of the vehicle for controlling the transmission ratio of said hydrostatic transmissions;

a first L-shaped gear box secured to said first hydrostatic transmission and a second L-shaped gear box secured to said second hydrostatic transmission, each of said gear boxes extending over front and outer side of the hydrostatic transmission to which it is secured, and wherein said transmission output shafts lie in a first plane, said axles lie in a second plane substantially the same as said first plane, a length of said engine output shaft lies in a third plane parallel to and separate from said first plane and said transmission input shafts lie in a fourth plane parallel to and between said first and third planes said transmission output shaft of said first hydrostatic transmission extending into the first gear box, said transmission output shaft of said second hydrostatic transmission extending into said second gear box, said first axle being journaled in said first gear box, said second axle being journaled in said second gear box, each of said gear boxes including therein:

a rotatable, intermediate shaft extending parallel with said transmission output shaft, a first reduction gear train having a first spur gear fixedly mounted on said transmission output shaft and a second spur gear mounted on said intermediate shaft, said second spur gear meshing with said first spur gear, and a second reduction gear train having a first bevelled gear fixedly mounted on said intermediate shaft and a second bevelled gear mounted on the wheel axle, said second bevelled gear meshing with said first bevelled gear; and transmitting means for drivingly connecting the engine output shaft with the transmission input shafts of said pair of hydrostatic transmissions and wherein said transmission output shafts lie in a first plane, said axles lie in a second plane substantially the same as said first plane, a length of said engine output shaft lies in a third plane parallel to and separate from said first plane and said transmission input shafts lies in a fourth plane parallel to and between said first and third planes.

* * * * *

UNITED STATES PATENT AND TRADEMARK OFFICE
CERTIFICATE OF CORRECTION

PATENT NO. : 4,819,508

DATED : April 11, 1989

INVENTOR(S) : Kojiro Yamaoka et al

It is certified that error appears in the above-identified patent and that said Letters Patent is hereby corrected as shown below:

Col. 11, line 34 through Col. 12, line 5 delete "and wherein said transmission output shafts lie in a first plane, said axles lie in a second plane substantially the same as said first plane, a length of said engine output shaft lies in a third plane parallel to and separate from said first plane and said transmission input shafts lie in a fourth plane parallel to and between said first and third planes"  and insert  --the front side of each hydrostatic transmission consisting of a side thereof which is farthest from the rear of said frame and the outer side of each hydrostatic transmission consisting of a side thereof which faces away from said vehicle,--.

Signed and Sealed this

Twelfth Day of December, 1989

Attest:

JEFFREY M. SAMUELS

Attesting Officer

Acting Commissioner of Patents and Trademarks